United States Patent
Suematsu (10) Patent No.: US 9,004,027 B2
(45) Date of Patent: Apr. 14, 2015

(54) CAM-DATA CREATION DEVICE AND CAM-DATA CREATION PROGRAM

(75) Inventor: Keiji Suematsu, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 96 days.

(21) Appl. No.: 13/642,744

(22) PCT Filed: May 26, 2010

(86) PCT No.: PCT/JP2010/058927
§ 371 (c)(1),
(2), (4) Date: Oct. 22, 2012

(87) PCT Pub. No.: WO2011/148477
PCT Pub. Date: Dec. 1, 2011

(65) Prior Publication Data
US 2013/0038742 A1    Feb. 14, 2013

(51) Int. Cl.
  *F01L 1/34*  (2006.01)
  *H02K 29/12*  (2006.01)
  *G05B 19/4093*  (2006.01)

(52) U.S. Cl.
CPC  *G05B 19/40931* (2013.01); *G05B 2219/34343* (2013.01)

(58) Field of Classification Search
None
See application file for complete search history.

(56) References Cited

U.S. PATENT DOCUMENTS

| | | | |
|---|---|---|---|
| 5,950,799 A * | 9/1999 | Peltier et al. | 198/430 |
| 6,333,613 B1 | 12/2001 | Watanabe et al. | |
| 6,449,044 B1 * | 9/2002 | Pawa | 356/394 |
| 2003/0236778 A1 | 12/2003 | Masumoto et al. | |

FOREIGN PATENT DOCUMENTS

| JP | 11-259135 | * | 9/1999 |
|---|---|---|---|
| JP | 11-259135 A | | 9/1999 |
| JP | 2003-263209 A | | 9/2003 |
| JP | 2004-30122 A | | 1/2004 |
| JP | 3847585 B2 | | 11/2006 |
| JP | 2009-187449 | * | 8/2009 |
| JP | 2009-187449 A | | 8/2009 |

OTHER PUBLICATIONS

Notice of Rejection, dated Mar. 5, 2013, JPA No. 2012-517046.

(Continued)

*Primary Examiner* — Lin Ye
*Assistant Examiner* — Euel Cowan
(74) *Attorney, Agent, or Firm* — Sughrue Mion, PLLC; Richard C. Turner (57) ABSTRACT

A cam-data creation device includes: a waveform generating/processing unit that generates at least one of a stroke waveform and a velocity waveform of a follower for each piece of cam data from cam data stored in a cam-data storage unit, a cam-data waveform-image processing unit that converts a waveform for each piece of cam data generated by the waveform generating/processing unit into image data, and a screen generating/processing unit that generates a list display window that collectively displays the waveform for every piece of cam data having been converted into image data by the cam-data waveform-image processing unit and displays the generated list display window on a display device.

8 Claims, 5 Drawing Sheets

(56) References Cited

OTHER PUBLICATIONS

Korean Office Action (Notice of Preliminary Rejection), mailed Oct. 31, 2014, Application No. 10-2012-7029090.

Communication dated Aug. 20, 2014 from the State Intellectual Property Office of the People's Republic of China in counterpart application No. 201080066975.4.

* cited by examiner

FIG.4

| CAM DATA LIST | | | | | |
|---|---|---|---|---|---|
| GRAPH | | | | | |
| CAM No. | 1 | 2 | 3 | 4 | |
| SETTING METHOD | SET BY STROKE RATIO | SET BY STROKE RATIO | SET BY STROKE RATIO | SET BY STROKE RATIO | |
| CAM RESOLUTION | 512 | 512 | 256 | 256 | |
| CAM-DATA START POSITION | 0 | 0 | 0 | 0 | |
| COMMENT | FEED CAM 1 | FEED CAM 2 | RECIPROCATING CAM 1 | RECIPROCATING CAM 2 | |
| GRAPH | | | | | |
| CAM No. | 5 | 6 | 7 | | |
| SETTING METHOD | SET BY STROKE RATIO | SET BY STROKE RATIO | SET BY STROKE RATIO | | |
| CAM RESOLUTION | 512 | 256 | 256 | | |
| CAM-DATA START POSITION | 0 | 0 | 0 | | |
| COMMENT | INVERTED CAM 1 | INVERTED CAM 2 | RECIPROCATING CAM 3 | | |

FIG.6

CAM-DATA CREATION DEVICE AND CAM-DATA CREATION PROGRAM

CROSS REFERENCE TO RELATED APPLICATIONS

This application is a National Stage of International Application No. PCT/JP2010/058927, filed on May 26, 2010, the contents of all of which are incorporated herein by reference in their entirety.

FIELD

The present invention relates to a cam-data creation device and a cam-data creation program that create cam data that operates an electronic cam.

BACKGROUND

Conventionally, cam data for operating an electronic cam is created by using dedicated software (a cam-data creation program). According to a general cam-data creation program, an identification number (a cam number) is allocated to each created piece of cam data and a list of cam numbers of the respective created pieces of cam data is displayed. When a user wishes to confirm the content of each piece of cam data, the user makes confirmation by designating cam numbers displayed on a list display window one by one and expanding the content of cam data corresponding to a designated cam number on another window.

A drawing-search support device disclosed in Patent Literature 1 extracts drawing areas from image data of a plurality of pieces of drawing information, creates icons from the respective extracted drawing areas, and collectively displays each of the created icons. A program disclosed in Patent Literature 2 displays parts of a ladder program and screen data in a reduced manner such as thumbnails.

CITATION LIST

Patent Literatures

Patent Literature 1: Japanese Patent Application Laid-open No. 2004-030122
Patent Literature 2: Japanese Patent No. 3847585

SUMMARY

Technical Problem

According to the conventional cam-data creation program described above, when target cam data is searched, a user needs to open windows one by one. Accordingly, it takes a long time and many screens are opened. In this way, the conventional cam-data creation program is complicated and inconvenient for users.

The present invention has been achieved in view of the above problems, and an object of the present invention is to provide a cam-data creation device and a cam-data creation program that are easy to handle.

Solution to Problem

In order to solve the aforementioned problems, a cam-data creation device according to one aspect of the present invention is configured to include: a display device; a cam-data storage unit that stores therein cam data in which a physical quantity for identifying the position of a follower is associated with a cam angle or a physical quantity corresponding to a cam angle for each cam; a waveform generating/processing unit that generates at least one of a stroke waveform and a velocity waveform of a follower for each piece of cam data from cam data stored in the cam-data storage unit; a cam-data waveform-image processing unit that converts a waveform for each piece of cam data generated by the waveform generating/processing unit into image data; and a screen generating/processing unit that generates a list display screen that collectively displays a waveform for each piece of cam data having been converted into image data by the cam-data waveform-image processing unit and displays the generated list display screen on the display device.

Advantageous Effects of Invention

According to the cam-data creation device of the present invention, users can check a waveform for each piece of cam data from a list display screen. Accordingly, the device is more convenient for the users.

DESCRIPTION OF EMBODIMENTS

Exemplary embodiments of a cam-data creation device and a cam-data creation program according to the present invention will be explained below in detail with reference to the accompanying drawings. The present invention is not limited to the embodiments.

Embodiment

Figure 1:
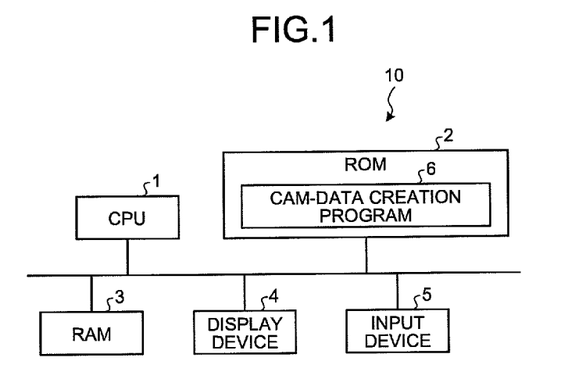
FIG. 1 is a block diagram of an example of a hardware configuration of a cam-data creation device according to an embodiment.

FIG. 1 is a block diagram of an example of a hardware configuration of a cam-data creation device according to an embodiment of the present invention. As shown in FIG. 1, a cam-data creation device 10 according to the present invention has a configuration equivalent to that of a general computer including a CPU (Central Processing Unit) 1, a ROM (Read Only Memory) 2, a RAM (Random Access Memory) 3, a display device 4, and an input device 5. The CPU 1, the ROM 2, the RAM 3, the display device 4, and the input device 5 are connected to each other via a bus line.

The CPU 1 executes a cam-data creation program 6 that is a computer program for creating cam data. The display device 4 is a display device such as a monitor, like a liquid crystal monitor or a CRT, and displays an edit window serving as an editor for creating and editing cam data and a list display window that displays a list of created cam data based on an instruction from the CPU 1. The input device 5 is configured to include a mouse and a keyboard, and contents of operations of the cam-data creation device 10 conducted by a user such as an input of an instruction of executing the cam-data creation program 6, an edit input of cam data, and an input of a list-display instruction of displaying a list display window are input to the input device 5. The contents of operations input to the input device 5 are transmitted to the CPU 1.

The cam-data creation program 6 is stored in the ROM 2 and loaded to the RAM 3 via a bus line. The CPU 1 executes the cam-data creation program 6 loaded into the RAM 3. Specifically, in the cam-data creation device 10, the CPU 1 reads the cam-data creation program 6 from the ROM 2 according to an input of an execution instruction from the input device 5 by a user. The CPU 1 then expands the thus read out cam-data creation program 6 in a program storage area in the RAM 3 and executes the cam-data creation program 6 expanded in the RAM 3, so that various functions explained later on are realized.

Figure 2:
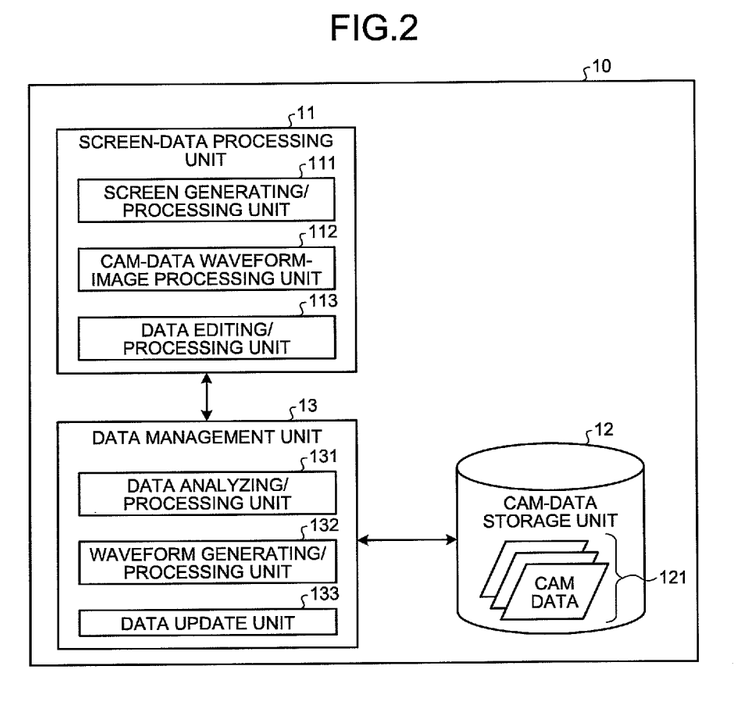
FIG. 2 is an explanatory diagram of functions of a cam-data creation device 10 according to the embodiment of the present invention.

FIG. 2 is an explanatory diagram of functions of the cam-data creation device 10 according to the embodiment of the present invention realized when CPU 1 executes the cam-data creation program 6. As shown in FIG. 2, the cam-data creation device 10 generally includes a screen-data processing unit 11, a cam-data storage unit 12, and a data management unit 13.

The cam-data storage unit 12 is a storage area in which created cam data 121 is stored. The cam-data storage unit 12 does not need to be secured in the RAM 3 and can be secured in an external storage device (not shown). Each of the cam data 121 is profile information of each virtual cam, which is obtained by associating a physical quantity for identifying the position of a follower with a cam angle and expanded. For example, a position coordinate itself or a stroke ratio of the follower is used for the physical quantity for identifying the position of the follower. It is assumed that the cam data 121 is data that the stroke ratio or the position coordinate is defined for every cam angle obtained by dividing a cam angle of a rotation by a predetermined step width (a resolution) or a resolution set by a user.

A physical quantity different from the cam angle can be also used as a quantity associated with the physical quantity for identifying the position of the follower. For example, the rotating speed of a virtual cam (one cycle period) is determined as a rated speed, and a temporal change in the physical quantity for identifying the position of the follower can be used as the cam data 121. In this case, by multiplying the time by the rated speed, it can be converted into correspondence between the physical quantity for identifying the position of the follower and the cam angle. In addition to the time explained above, any physical quantity can be used as the physical quantity for defining the cam data 121 as long as it is a physical quantity that can be converted into a cam angle (a physical quantity corresponding to the cam angle).

The screen-data processing unit 11 includes a screen generating/processing unit 111, a cam-data waveform-image processing unit 112, and a data editing/processing unit 113.

In the cam-data creation device 10, the CPU 1 controls various hardware components (the ROM 2, the RAM 3, the display device 4, and the input device 5) based on an operating system. Particularly, basic functions related to a graphical user interface (GUI) such as basic controls, for example operations by buttons and scroll bars of windows displayed on the display device 4 and inputting by a mouse or a keyboard, are provided by an API (Application Program Interface) included in the operating system. The screen generating/processing unit 111 utilizes such an API for the GUI to generate a list display window and an edit window for cam data and display the thus generated windows on the display device 4. The data editing/processing unit 113 detects an operation of the edit window from the input device 5 via the API and recognizes the detected operation content as an edit input for cam data. The data editing/processing unit 113 sends temporary data of the cam data 121, to which the recognized edit input has been reflected, to the data management unit 13. The cam-data waveform-image processing unit 112 converts cam waveform data transmitted from the data management unit 13 into bit-map image data, thereby insetting the transmitted data in the list display window.

The data management unit 13 includes a data analyzing/processing unit 131, a waveform generating/processing unit 132, and a data update unit 133.

The data analyzing/processing unit 131 performs an analysis for creating cam waveform data from the cam data 121 stored in the cam-data storage unit 12. The cam waveform data is graph data wherein at least one of the stroke ratio and the speed of the follower is plotted with a horizontal axis indicating the cam angle or a physical quantity corresponding to the cam angle. It is assumed that the cam waveform data is data wherein the stroke ratio and the speed of the follower are plotted for a user to easily understand characteristics of a cam. The horizontal axis indicates the cam angle.

The data analyzing/processing unit 131 analyzes the cam data 121 to extract the physical quantity for identifying the position of the follower and the cam angle or the physical quantity corresponding to the cam angle in pair. The waveform generating/processing unit 132 calculates the stroke ratio and the speed for every cam angle from a pair extracted by the data analyzing/processing unit 131 and creates cam waveform data wherein the calculated stroke ratio and the calculated speed for every cam angle are plotted.

The data update unit 133 overwrites the cam data 121 stored in the cam-data storage unit 12 by temporary data from the data editing/processing unit 113 and informs the screen-data processing unit 11 of an update notification notifying that the list display window is updated by using the overwritten cam data 121.

The operation of the cam-data creation device 10 configured as explained above is explained next with reference to FIGS. 3 to 6.

Figure 3:
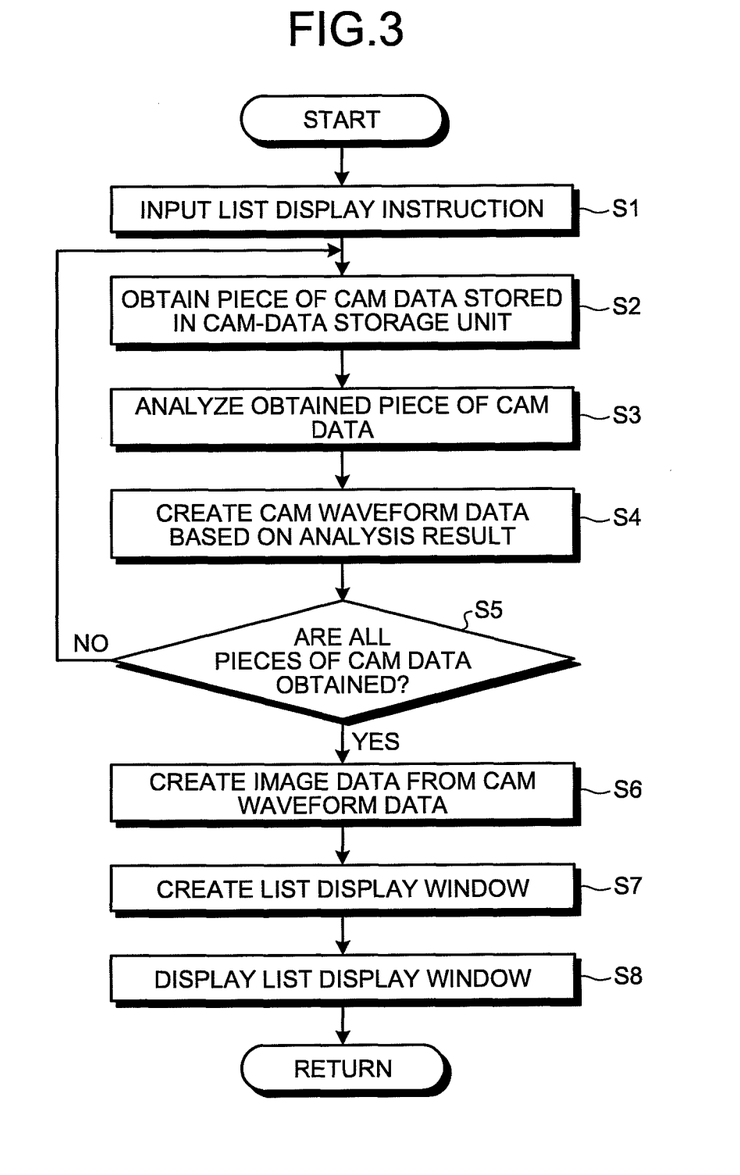
FIG. 3 is a flowchart for explaining an operation of displaying a list display window.

FIG. 3 is a flowchart for explaining the operation of displaying a list display window. As shown in FIG. 3, when a user performs an input of a list display instruction (Step S1), the screen-data processing unit 11 recognizes the input of the list-display instruction input and instructs the data management unit 13 to obtain cam data and create cam waveform data. The data analyzing/processing unit 131 obtains a piece of the cam data 121 from the cam-data storage unit 12 (Step S2) and analyzes the obtained piece of the cam data 121 (Step S3). The waveform generating/processing unit 132 creates cam waveform data based on an analysis result (Step S4). The data analyzing/processing unit 131 determines whether all pieces of the cam data 121 stored in the cam-data storage unit 12 are obtained (Step S5). When there are some unobtained pieces of the cam data 121 (NO at Step S5), the process proceeds to Step S2 and one of the unobtained pieces of the cam data 121 is selected.

When all pieces of the cam data 121 are obtained (YES at Step S5), the created cam waveform data and the obtained cam data 121 are sent to the screen-data processing unit 11 as temporary data and the cam-data waveform-image processing unit 112 creates image data from each of the sent pieces of the cam waveform data (Step S6). The screen generating/processing unit 111 arranges the respective created pieces of the image data to create a list display window (Step S7) and displays the created list display window on the display device 4 (Step S8). The operation of displaying the list display window is then returned.

Figure 4:
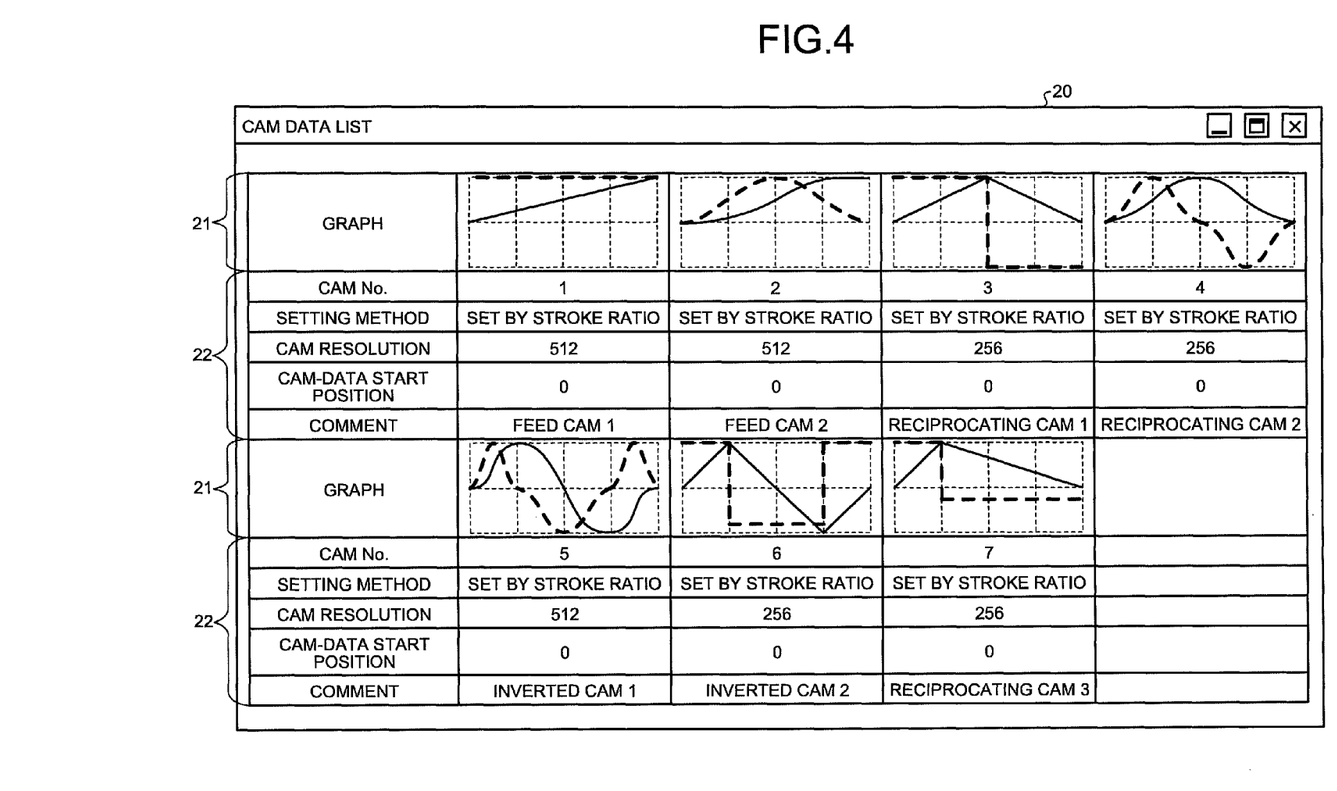
FIG. 4 is an explanatory diagram of an example of the list display window.

FIG. 4 is an explanatory diagram of an example of the list display window. As shown in FIG. 4, a list display window 20 named "cam-data list" includes a graph area 21 in which image data are displayed and a property area 22 in which a property of each of the cam data 121 is displayed. In the property area 22, items such as a cam number (cam No.), a setting method, a resolution (a cam resolution), a cam-data start position, and a comment are displayed for each piece of image data. The property for each piece of cam data 121 is stored in the cam-data storage unit 12, being associated with each of the cam data 121 and 2. The data management unit 13 obtains the property as well as the cam data 121 from the cam-data storage unit 12 and the screen generating/processing unit 111 displays the obtained property on the list display window 20.

Because cam curves of the cam data 121 created by a user are collectively displayed on the list display window 20 in this way, the content of each piece of the cam data 121 is easily understood as compared to a case of displaying only cam numbers on a list. That is, users' convenience of the cam-data creation device is improved.

The list display window 20 can receive an input of selecting desired cam data 121 (a selective input). The selective input is completed when one of display areas allocated to the respective pieces of the cam data 121 in the graph area 21 or the property area 22 is clicked. When the selective input is conducted, an edit window for editing a piece of the cam data 121 that receives the selective input is displayed and the selected piece of the cam data 121 becomes editable.

Figure 5:
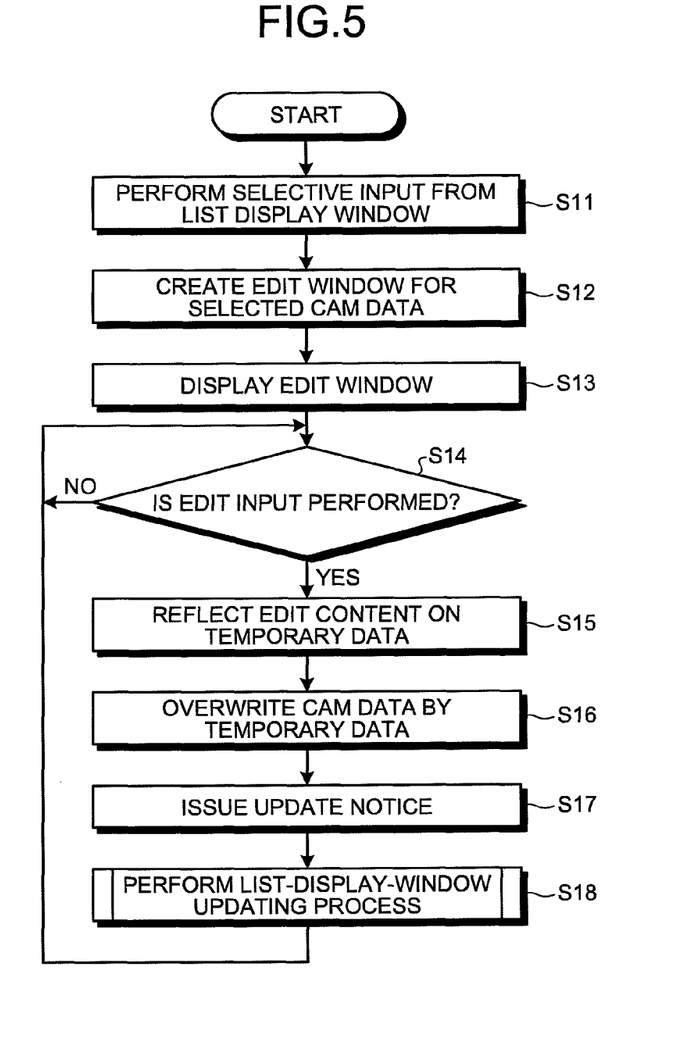
FIG. 5 is a flowchart for explaining an operation at the time of editing cam data.

FIG. 5 is a flowchart for explaining the operation at the time of editing the cam data 121. As shown in FIG. 5, when a user performs a selective input (Step S11), the screen generating/processing unit 111 creates an edit window for editing a selected piece of the cam data 121 by using the already obtained cam data 121 (Step S12), and displays the created edit window on the display device 4 (Step S13).

Figure 6:
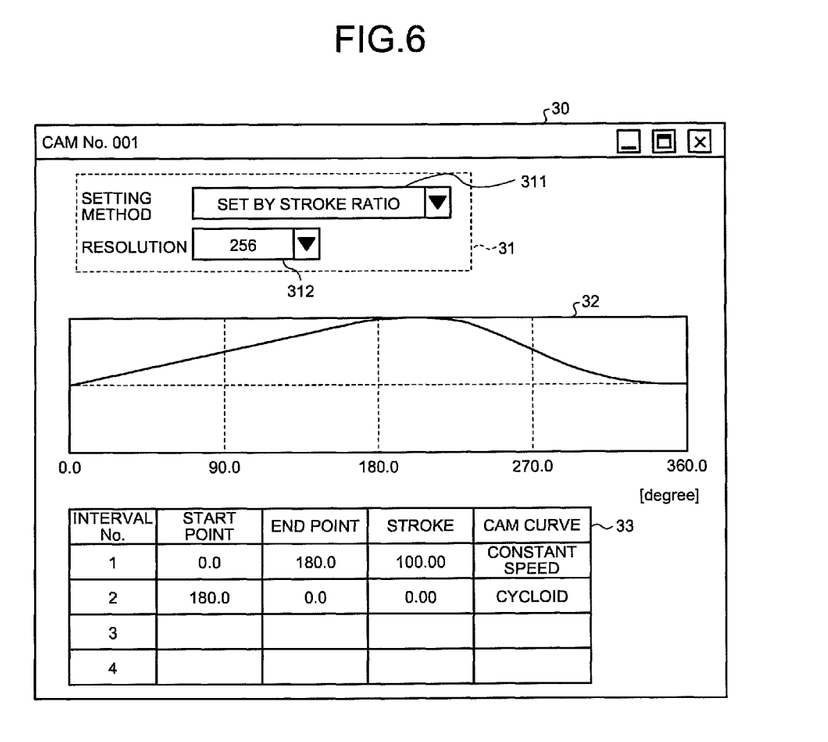
FIG. 6 is an example of an edit window.

FIG. 6 is an example of an edit window. As shown in FIG. 6, an edit window 30 includes a setting-method setting area 31 in which a setting method is set and displayed, a graph area 32 in which waveform data of the cam data 121 is displayed, and a set-content setting area 33 in which a set content is set and displayed.

The setting-method setting area 31 includes a field 311 in which whether a cam shape is set by the stroke ratio or the position coordinate is selected and displayed and a field 312 in which the resolution is input and displayed. For example, setting the cam shape by the stroke ratio is selected and displayed in the field 311. According to each of the fields 311 and 312, choices are displayed in a pull-down manner by pressing an inverted triangular button shown at the right of each of the fields 311 and 312. When a user selects one of the choices displayed in the pull-down manner, the setting method and the resolution can be set.

A waveform graph of the cam data 121 at the time of editing is displayed in the graph area 32.

In the set-content setting area 33, a function can be defined for every desired interval. A user creates the cam data 121 by using the function for every interval. In this example, it is set that the stroke ratio is increased at a constant speed in an interval of a cam angle of 0° to 180° and decreased by a cycloid curve in an interval of a cam angle of 180° to 360°.

Subsequent to Step S13, the data editing/processing unit 113 determines whether there has been an edit input to the currently displayed edit window (Step S14). When the edit input is not detected (NO at Step S14), the process of Step S14 is continued.

When the edit input is detected (YES at Step S14), the data editing/processing unit 113 reflects an edit-input content (an edit content) on the cam data 121 serving as the temporary data sent at Step S6 (Step S15). The data update unit 133 overwrites the corresponding cam data 121 stored in the cam-data storage unit 12 by the temporary data (Step S16) and, when overwriting is completed, issues an update notification to the screen-data processing unit (Step S17). A list-display-window updating process that updates a list display window is then performed (Step S18) and the process proceeds to Step S14. Because the list-display-window updating process is identical to the operation of Steps S2 to S8, detailed explanations thereof will be omitted.

While an explanation has been made on the assumption that every time the data editing/processing unit 113 detects an edit input, the data update unit 133 overwrites the cam data 121 by temporary data, the data update unit 133 does not have to overwrite the cam data 121 every time when the data editing/processing unit detects an edit input. For example, the overwriting can be made also at a predetermined time interval or every time an edit input is detected for a predetermined time.

As explained above, according to the embodiment of the present invention, it is configured to include the waveform generating/processing unit 132 that generates at least one of a stroke waveform and a velocity waveform of the follower for each piece of cam data from the cam data 121 stored in the cam-data storage unit 12, the cam-data waveform-image processing unit 112 that converts a waveform for each piece of cam data generated by the waveform generating/processing unit 132 into image data, and the screen generating/processing unit 111 that generates the list display window 20 that collectively displays the waveform for each piece of cam data having been converted into the image data by the cam-data waveform-image processing unit 112 and displays the thus generated list display window 20 on the display device 4. Because a user can check the waveform for each piece of cam data from the list display window 20, the cam-data creation device 10 that is convenient for users can be obtained.

It is configured to also include the data update unit 133 that reflects an edit content inputted via the edit window 30 on the corresponding cam data 121 stored in the cam-data storage unit 12, and after the edit content is reflected on the corresponding cam data 121, issues an update notification notifying that the list display window 20 is made to be updated. Accordingly, a user can acquire the latest waveform from the list display window 20 and thus users' convenience is further improved.

The screen generating/processing unit 111 is configured to display the edit window 30 for editing a selected piece of cam data 121 on the display device 4 upon reception of an input of selecting a piece of the cam data 121 via the list display window 20 displayed on the display device 4. Accordingly, a user can select the cam data 121 to be edited while viewing a waveform list displayed on the list display window 20. Accordingly, users' convenience is further improved.

The list display window 20 may also be configured so that a command can be edited. For example, it is preferable to set that the data editing/processing unit 113 monitors an edit input via a comment display area, and when the edit input is detected, the cam-data creation device 10 updates property information stored in the cam-data storage unit 12 and the list display window by a process identical to that when an edit input via the edit window 30 is detected. Specifically, it is preferable to set that the data update unit 133 receives an edit content for a comment inputted via the list display window 20, reflects the received edit content for the comment on the corresponding property information stored in the cam-data storage unit 12, and issues an update notification after the edit content is reflected on the corresponding property information. By doing so, desired comments can be created so that the respective pieces of the cam data 121 can be easily identified, and thus users' convenience is further improved.

Similarly to the comment explained above, the list display window 20 may be configured so that a cam number can be edited. It is also possible to set that a position where the cam number is displayed can be changed by a drag-and-drop operation on the list display window 20, and when a change in display position is detected, the data editing/processing unit 113 re-allocates cam numbers that have already been allocated to respective pieces of cam data on the list display window 20 according to the display position and updates the property information stored in the cam-data storage unit 12 and the list display window by a process which is identical to a process when an edit input via the edit window 30 is detected. Because the cam number can be desirably changed, users' convenience can be further improved.

INDUSTRIAL APPLICABILITY

As described above, the cam-data creation device and the cam-data creation program according to the present invention are suitable when applied to a cam-data creation device and a cam-data creation program that create cam data that operates an electronic cam.

REFERENCE SIGNS LIST

1 CPU
2 ROM
3 RAM
4 DISPLAY DEVICE
5 INPUT DEVICE
6 CAM-DATA CREATION PROGRAM
10 CAM-DATA CREATION DEVICE
11 SCREEN-DATA PROCESSING UNIT
12 CAM-DATA STORAGE UNIT
13 DATA MANAGEMENT UNIT
20 LIST DISPLAY WINDOW
21 GRAPH AREA
22 PROPERTY AREA
30 EDIT WINDOW
31 SETTING-METHOD SETTING AREA
32 GRAPH AREA
33 SET-CONTENT SETTING AREA
111 SCREEN GENERATING/PROCESSING UNIT
112 CAM-DATA WAVEFORM-IMAGE PROCESSING UNIT
113 DATA EDITING/PROCESSING UNIT
121 CAM DATA
131 DATA ANALYZING/PROCESSING UNIT
132 WAVEFORM GENERATING/PROCESSING UNIT
133 DATA UPDATE UNIT
311 FIELD
312 FIELD

The invention claimed is:

1. A cam-data creation device comprising:
a display device;
a cam-data storage unit configured to store pieces of cam data in which a physical quantity for identifying a position of a follower is associated with a cam angle or a physical quantity corresponding to a cam angle, for each piece of the cam data;
a waveform generating/processing unit configured to generate a waveform, which comprises at least one of a stroke waveform and a velocity waveform of the follower, for each corresponding piece of the cam data stored in the cam-data storage unit;
a cam-data waveform-image processing unit configured to convert corresponding waveforms generated for each piece of the cam data, into image data; and
a screen generating/processing unit configured to generate and display a list display screen that collectively displays the corresponding waveforms for each piece of the cam data, having been converted into the image data, together with property information of each piece of the cam data,
wherein the property information includes at least one of a cam resolution and a cam data start position.

2. The cam-data creation device according to claim 1, wherein the screen generating/processing unit generates an edit screen for editing cam data stored in the cam-data storage unit and displays the generated edit screen on the display device, and
the cam-data creation device further comprises a data update unit that reflects an edit content inputted via the edit screen on corresponding pieces of the cam data stored in the cam-data storage unit, and, after the edit content is reflected on the corresponding pieces of the cam data, issues an update notification notifying that the list display screen is updated.

3. The cam-data creation device according to claim 2, wherein, when the screen generating/processing unit receives an input of selecting a piece of the cam data via the list display screen displayed on the display device, the screen generating/processing unit displays an edit screen for editing the selected piece of the cam data on the display device.

4. The cam-data creation device according to claim 1, wherein the cam-data storage unit stores each piece of the cam data by associating each piece of the cam data with the property information, and
the list display screen includes an area in which the property information is displayed being associated with the waveform for a corresponding piece of the cam data.

5. The cam-data creation device according to claim 4, further comprising:
a data update unit that receives an edit content inputted via the list display screen, reflects the received edit content in corresponding property information stored in the cam-data storage unit, and, after the edit content is reflected in the corresponding property information, issues an update notification notifying that the list display screen is updated.

6. The cam-data creation device according to claim 4, wherein the property information includes a comment.

7. The cam-data creation device according to claim 4, wherein the property information further includes an identification number that identifies each piece of cam data.

8. A non-transitory computer-readable storage medium having an executable program stored thereon, wherein the program, when executed by a processor of a cam-data creation device, causes the cam-data creation device to execute:
a step of generating a waveform comprising at least one of a stroke waveform and a velocity waveform of a follower, for each piece of cam data stored in a cam-data storage unit that stores the pieces of the cam data in which a physical quantity for identifying a position of a follower is associated with a cam angle or a physical quantity corresponding to a cam angle;

a step of converting corresponding waveforms generated for each piece of the cam data, into image data;

a step of generating a list display screen that collectively displays the corresponding waveforms for each piece of the cam data having been converted into image data; and a step of displaying the generated list display screen on a display device together with property information of each piece of the cam data, wherein the property information includes at least one of a cam resolution and a cam data start position.

* * * * *